UNITED STATES PATENT OFFICE.

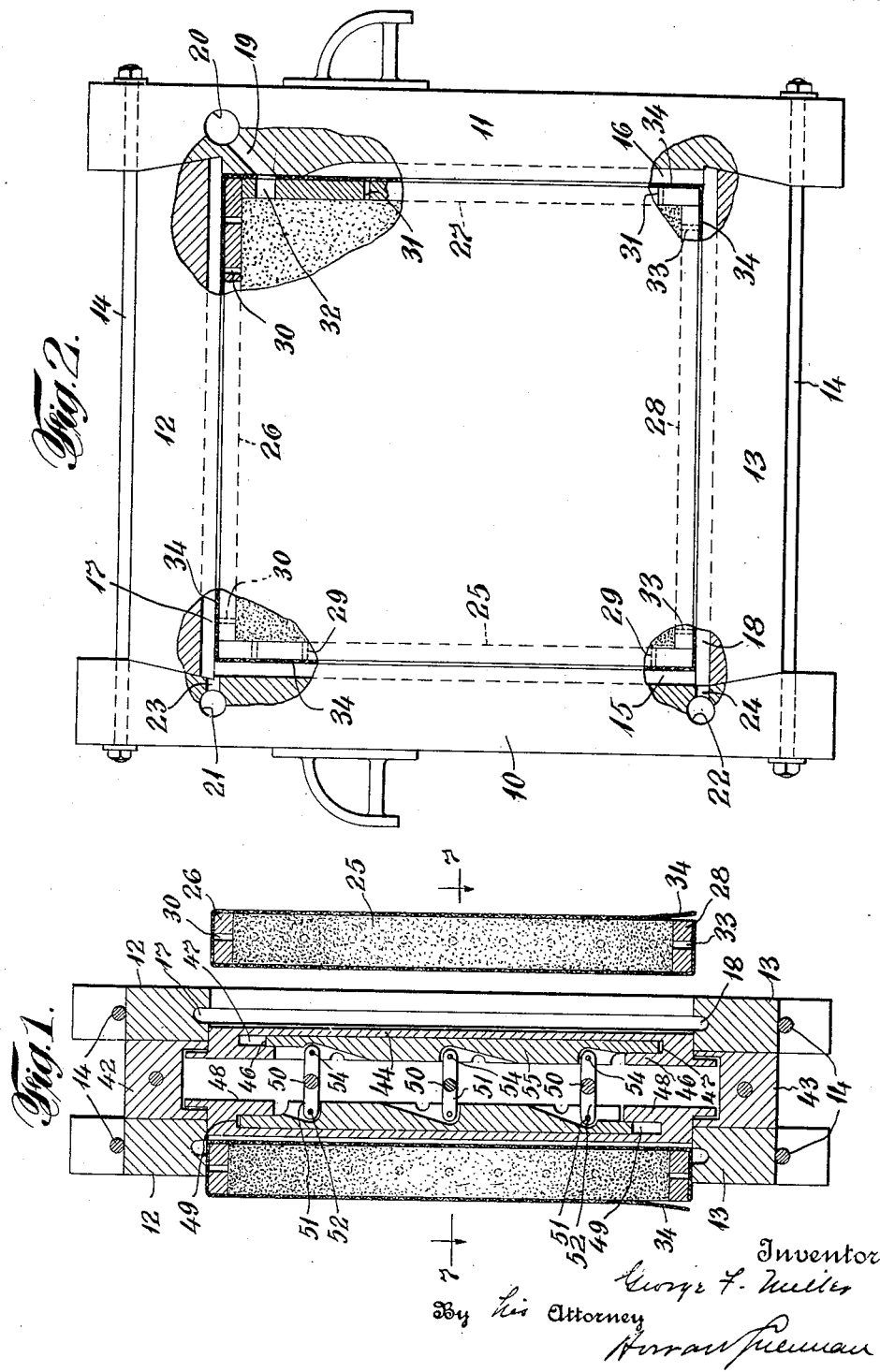

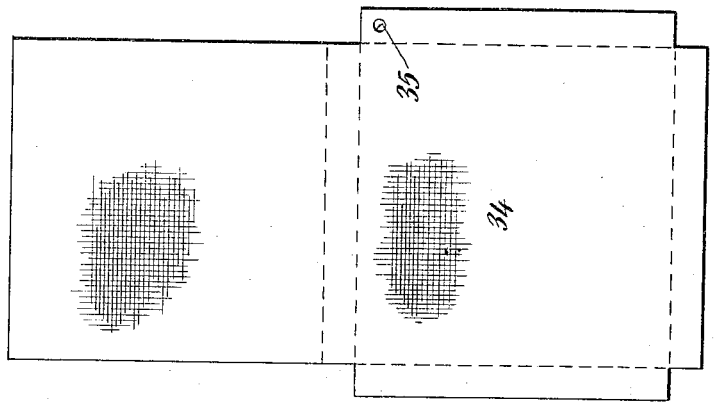
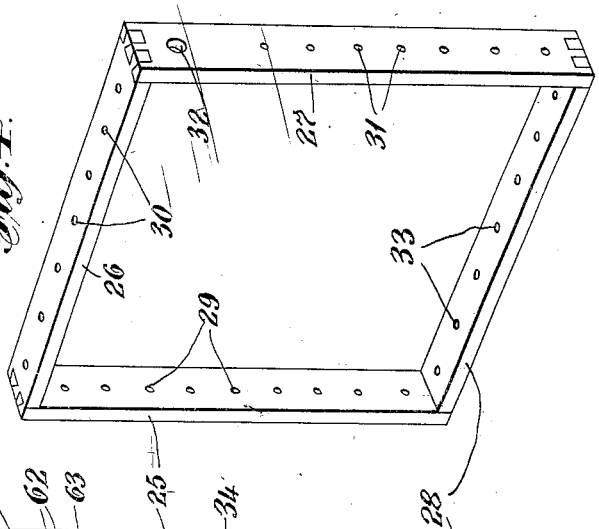
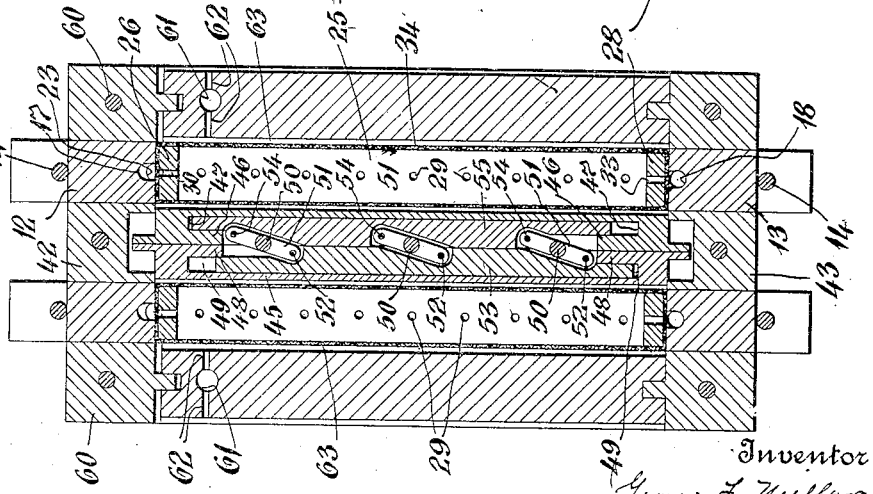

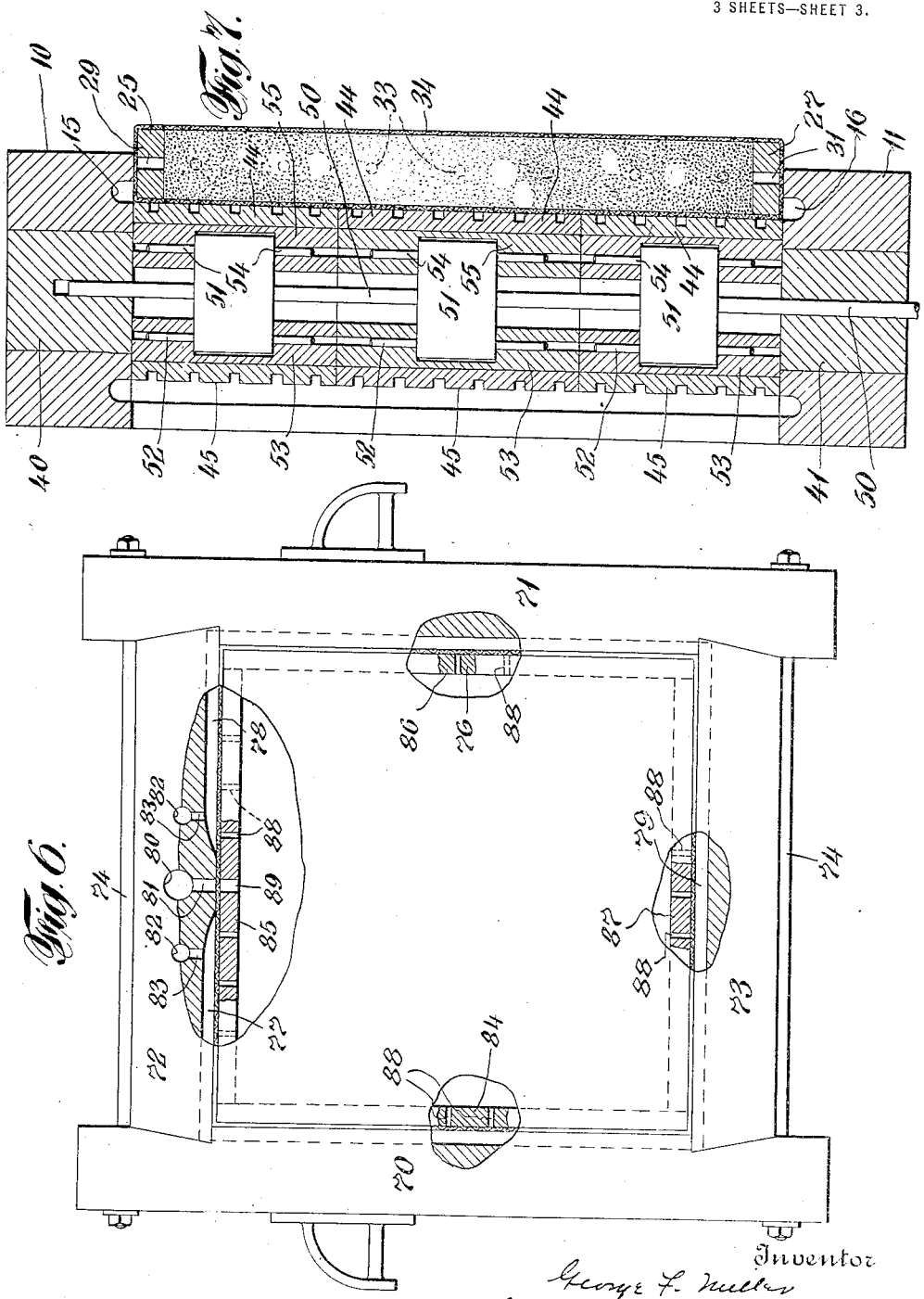

GEORGE F. MILLER, OF NEW YORK, N. Y.

FILTER-PRESS FRAME.

1,337,251.   Specification of Letters Patent.   Patented Apr. 20, 1920.

Application filed June 17, 1919. Serial No. 304,862.

*To all whom it may concern:*

Be it known that I, GEORGE F. MILLER, a citizen of the United States, residing in the city of New York, county of New York, borough of Manhattan, and State of New York, have invented certain new and useful Improvements in Filter-Press Frames, of which the following is a full, clear, and exact specification.

My invention relates to filter press devices and refers particularly to filter press frames.

One object of my invention is a filter press frame having a removable filter cloth holder.

Another object of my invention is a filter press frame capable of carrying a filter cloth which can be removed from the frame by means of an abutting expansible member.

Another object of my invention is a filter press frame carrying means for the effective removal of a filter cloth and its filtered contents therefrom.

Another object of my invention is a filter press frame adapted for the complete washing of an inclosed filtered mass with a minimum of water.

Another object of my invention is a filter press frame in which an inclosed mass of filtered material may be subjected to a washing liquid injected into the mass from all sides.

Another object of my invention is an improved washing device which may be readily removed from the frame with its filtered contents.

These and other objects of my invention will be evident upon a consideration of my drawings and specification.

The ordinary filter press comprises a series of alternate abutting wash plates and filter press frames with filter cloth interposed. A series of chambers is thus formed, each inclosed by the four sides of a frame and the filter cloth abutting upon the adjacent plates. The material to be filtered is forced into this frame chamber, the liquid passing outwardly through the filter cloth and the solid, or filtered, material remaining within the chamber. After the material is filtered, it is usually necessary to wash the filtered mass and this is accomplished by means of the wash plates, between which the filtered mass is maintained. The wash water is forced through conduits and down channels within the faces of the plates and thence into the mass. By this means the washing liquid, as water, is forced inwardly into the filtered mass from two sides only, and is then allowed to pass out of the press. Experience has shown that a very considerable amount of water is required to accomplish a thorough and complete washing, as the center of the mass packs solidly due to the two impinging flows of water, and hence it is difficult to wash this central portion. The large amount of water necessary for washing is a serious objection in those cases where the liquid and wash water contain the materials to be recovered, as the large amount of liquid to be later evaporated, or worked, renders the operation of recovery an expensive one.

I have overcome this difficulty by means of my device in which the filtered mass is subjected to a flow of wash water from all six sides, thus keeping the mass in a more loose condition, and rendering all portions of it readily accessible to the washing liquid. By the use of my device, the amount of time and the amount of necessary water are very materially reduced.

The usual method of assembling the frame and the cloth, is to have a filter cloth practically twice the size of the frame. The cloth is thrown over the top of the frame so that it will hang upon both sides of the frame.

By the use of my device much smaller filter cloths may be employed, thus saving in the initial cost of the cloth and in the time and labor incident to their washing.

When the filtering and washing processes are completed, it is necessary to remove the filtered material. This is usually accomplished by separating the plates and frames, removing one side of the cloth and digging out the filtered material by means of a suitable instrument and then removing the cloth from the frame. This process requires considerable manual labor and expenditure of time and results in a loss of material.

In the use of my device, the filter cloth and the filtered material are mechanically removed from the frame thus materially reducing the time and labor incident to their removal and preventing loss of material.

My device therefore possesses many valuable operative and economical features.

In the accompanying drawings, illustrating modifications of my device, similar parts are designated by similar numerals:—

Figure 1 is a vertical section of assembled plates and frames, with the expansible plate in expanded position.

Fig. 2 is a face view of one form of the frame of my invention, partly in section, showing the cloth-holder and cloth in position.

Fig. 3 is a vertical section of assembled plates and frames with the expansible plate in non-expanded position.

Fig. 4 is a perspective view of the cloth-holder.

Fig. 5 is a development of the filter cloth.

Fig. 6 is a face view of a modified form of the frame of my invention.

Fig. 7 is a section through the line 7—7 of Fig. 1.

The particular form of the device of my invention, shown in the accompanying drawings, comprises a frame composed of the side members 10 and 11, the top member 12 and the bottom member 13, clamped together by the stay-bolts 14, 14. The interior face of the side 10 has a recess channel 15, the interior face of the side 11 has a recess channel 16, the interior face of the top 12 has a recess channel 17 and the interior face of the bottom 13 has a recess channel 18. The recess channel 16 does not extend the entire face of the side 11, but stops before it reaches the conduit 19. A channel is thus formed completely around the inner face of the frame with the exception of that portion immediately adjacent to the conduit 19. A feed conduit 20 passes through the side member 11 and is connected with the conduit 19. Wash conduits 21 and 22 pass through the side member 10 and are connected to the channel 15 by the conduits 23 and 24 respectively.

Placeable within the frame, and removable therefrom, is a cloth-holding member comprising the sides 25, 26, 27 and 28 dovetailed together. The side 25 contains a series of conduits 29, 29 opening into the channel 15, the side 26 contains a series of conduits 30, 30 opening into the channel 17, the side 27 contains a series of conduits 31, 31 opening into the channel 16, and a conduit 32 capable of alinement with the conduit 19 and the side 28, contains a series of conduits 33, 33 opening into the channel 18.

To assemble the frame and filter cloth, a filter cloth 34, is placed around the cloth-holding device, the hole 35 of the cloth being in alinement with the hole 32 of the cloth-holder. The cloth 34 thus entirely incloses the cloth-holder. The cloth-holder with the filter cloth is then placed into the frame. The cloth thus forms a chamber, or bag, into which the material may be introduced through the conduits 30, 19 and 32. It will thus be seen that the cloth 34 and its contents may be removed from within the frame simply by moving the cloth-holder outwardly.

One method of accomplishing this is shown in Figs. 3 and 7. The expansible plate, thus shown, comprises the side members 40 and 41, the top member 42 and the bottom member 43. Within these members are two expansible members composed of a series of plates 44, 44, 44, 45, 45, 45. The extended ends 46, 46 of each plate 44 forms recesses 47, 47, and the extended ends 48, 48 of each plate 45 forms recesses 49, 49. A series of revoluble shafts 50, 50, 50 extend between and are supported by, and revoluble within, the side members 40 and 41, the lower shaft 50 extending through the side 41 and being capable of revolution from the exterior of the device. Fixedly attached to each shaft 50 is an arm 51, one extremity of each arm 51 being pivotally attached at 52 to the slidable members 53, 53, 53 and the other extremity of each arm 51 being pivotally attached at 54 to the slidable members 55, 55, 55. Each member 53 is slidable within the recesses 59, 59 and each member 55 is slidable within the recesses 47, 47.

Fig. 7 shows the expansible device in its unexpanded position, which is the position during the filtering process. When the filtering and washing operations are completed, the lower shaft 50 is revolved which causes the slidable members 53 and 55 to move upwardly and downwardly, at the same time moving outwardly forcing the two series of plates to move outwardly from each other, into the position shown in Fig. 1. This outward movement of the members forces the filter cloth holder members, with the cloth and its contents, to also move outwardly from its retained position within the frame and this movement may be great enough to cause the cloth and its contents to fall into a suitable receptacle.

Adjacent to each filter frame is an ordinary wash plate 60 having the wash conduit 61 connected with a series of conduits 62, 62 which, in turn, connects with a series of channels 63, 63 within the faces of the wash plates so that a washing liquid, as water, passing through the conduits 61, and 62, 62 will be forced into the channels 63, 63 and thence through the cloth 34 into the material to be washed and thence outwardly in the ordinary manner.

The operation of the device is as follows:—

The plates and frames are assembled, as shown in Fig. 3. The material to be filtered is forced through the conduits 20, 19 and 32 until the chamber, or bag, formed by the cloth 34, has sufficient solid material within it. The conduit 20 is then closed by any suitable means, and wash water forced through the conduits 21, 22 and 61. The water passing through the conduits 21 and 22 passes through the conduits 23 and 24 into the channels 15, 16, 17 and 18, whence it is forced through the series of conduits 29, 29, 30, 30, 31, 31, 33, 33, and through the cloth 34 into the filtered mass from the four sides of the cloth-holder. At the same time the water passing through the conduits 61, 61, 62, 62 and the channels 63, 63 is forced inwardly into the filtered mass from the other two sides. It will thus be seen that the filtered mass is washed from all six sides, thus insuring a more complete washing with less wash water than can be accomplished when the mass is washed from only two sides.

When the mass is sufficiently washed, the wash plates 60, 60 are removed and the lower shaft 50 revolved. This expands the expansible plate, as shown in Fig. 1, and the cloth-holder with its contents will be dumped into a receptacle.

The modification of my device, shown in Fig. 6, comprises a frame composed of the sides 70 and 71, the top 72 and the bottom 73, clamped together by the stay bars 74, 74. The inner face of the side 70 has the channel 75, the inner face of the side 71 has the channel 76, the inner face of the top 72 has the unconnected channels 77 and 78, and the inner face of the bottom 73 has the channel 79. The top 72 has the feed conduit 80 connected to the conduit 81, and the wash conduits 82, 82 connected with the conduits 83, 83. The removable cloth-holder comprises the sides 84, 85, 86 and 87 having the conduits 88, 88, 88 connected with the adjacent frame channels. The side 85 of the cloth-holder also has the conduit 89 capable of alinement with the conduit 81. The operation of this modified frame is similar to that described above, the material to be filtered entering through the conduits 80, 81 and 89 and the wash water entering through the conduits 82, 82, 83, 83 into the channels 75, 76, 77, 78, 79, thence through the conduits 88, 88, 88 and the filter cloth into the filtered mass.

I have shown my filter frame assembled with expansible plates and ordinary wash plates in order to illustrate one form of assemblage, but my frames may be used with combinations of other plates and frames in order to produce the improved washing facilities as described.

It is evident that the same results may be produced if the channels are within the outer faces of the cloth-holder instead of within the inner faces of the frame, as shown.

I do not limit myself to the particular size, shape, number or arrangement of parts as shown and described, all of which may be varied without going beyond the scope of my invention as shown, described and claimed.

What I claim is:—

1. In a filter press frame, in combination, a frame, a removable cloth-holder placeable within the frame, a channel between the frame and the cloth-holder, a series of conduits connecting the channel with the inner faces of the cloth-holder, means whereby a material may be introduced into the chamber formed by the cloth-holder and means whereby a liquid may be introduced into the channel.

2. In a filter press frame, in combination, a frame, a removable cloth-holder placeable within the frame, a channel between a plurality of sides of the frame and the cloth-holder, a series of conduits connecting the channel with the inner faces of the cloth-holder, means whereby a material may be introduced into the chamber formed by the cloth-holder and means whereby a liquid may be introduced into the channel.

3. In a filter press frame, in combination, a frame, a channel within the inner faces of the frame, a removable cloth-holder capable of placement within the frame, conduits within the cloth-holder connecting the frame channel and the inner faces of the cloth-holder, means whereby material may be introduced into the chamber formed by the cloth-holder and means whereby a liquid may be introduced.

4. In a filter press frame, in combination, a frame, a channel within a plurality of sides of the inner faces of the frame, a removable cloth-holder capable of placement within the frame, conduits within the cloth-holder connecting the frame channel and the inner faces of the cloth-holder, means whereby material may be introduced into the chamber formed by the cloth-holder and means whereby a liquid may be introduced into the channel.

5. In a filter press frame, in combination, a frame, a removable cloth-holder capable of carrying a filter cloth in the form of an inclosed bag and placeable within the frame, a channel between the frame and the cloth-holder, a series of conduits connecting the channel with the inner faces of the cloth-holder, means whereby a material may be introduced into the chamber formed by the cloth-holder and means whereby a liquid may be introduced into the channel.

6. In a filter press frame, in combination, a frame, a channel within the inner faces of the frame, a removable cloth-holder capable of carrying a filter cloth in the form of an inclosed bag and capable of placement within the frame, conduits within the cloth-holder connecting the frame channel and the inner faces of the cloth-holder, means whereby material may be introduced into the chamber formed by the cloth-holder and means whereby a liquid may be introduced into the channel.

7. In a filter press frame, in combination, a frame, a removable cloth-holder capable of carrying a filter cloth in the form of an inclosed bag and placeable within the frame, means whereby a material may be introduced into the cloth bag and means whereby a liquid may be introduced into the cloth bag.

8. In a filter press frame, in combination, a frame, a removable cloth-holder capable of carrying a filter cloth in the form of an inclosed bag and placeable within the frame, means whereby a material may be introduced into the cloth bag and means whereby a plurality of streams of a liquid may be introduced through the filter cloth into material within the cloth bag.

9. In a filter press frame, in combination, a frame, a removable cloth-holder capable of carrying a filter cloth in the form of an inclosed bag and placeable within the frame, a channel between the frame and the cloth-holder, a series of conduits connecting the channel and the inner face of the cloth-holder, means for introducing material into the cloth bag and means whereby a liquid may be introduced into the channel and forced thence through the cloth and conduits into a material within the cloth bag.

10. In a filter press frame, in combination, a frame, a removable cloth-holder capable of carrying a filter cloth in the form of an inclosed bag and placeable within the frame, a channel within the inner faces of the frame, a series of conduits connecting the channel and the inner face of the cloth-holder, means for introducing material into the cloth bag and means whereby a liquid may be introduced into the channel and forced thence through the cloth and conduits into a material within the cloth bag.

Signed at New York city, in the county of New York, in the State of New York, this 10th day of June, 1919.

GEORGE F. MILLER.